(12) United States Patent
Smith et al.

(10) Patent No.: US 6,233,465 B1
(45) Date of Patent: May 15, 2001

(54) METHOD AND SYSTEM FOR CENTRAL OFFICE ACCESS TO MULTIPLE ACCESS CONTROLLERS FOR WIRELESS EXTENSION

(75) Inventors: Dennis C. Smith, Longmont; Charles I. Cook, Louisville, both of CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/223,745

(22) Filed: Dec. 31, 1998

(51) Int. Cl.[7] ........................................... H04B 1/38
(52) U.S. Cl. ..................... 455/560; 455/450; 455/460; 455/461
(58) Field of Search ................... 455/450, 460, 455/461, 560; 370/466, 467, 395

(56) References Cited

U.S. PATENT DOCUMENTS

| | | | |
|---|---|---|---|
| 5,873,036 | * | 2/1999 | Vucetic ................................ 455/439 |
| 5,884,187 | * | 3/1999 | Ziv et al. ............................. 455/522 |
| 5,949,773 | * | 9/1999 | Bhalla et al. ........................ 370/331 |
| 5,960,342 | * | 9/1999 | Liem et al. .......................... 455/428 |
| 5,974,331 | * | 10/1999 | Cook et al. .......................... 455/461 |
| 5,991,616 | * | 11/1999 | Mirza et al. ......................... 455/406 |
| 5,999,521 | * | 12/1999 | Thompson ........................... 370/328 |
| 6,014,377 | * | 1/2000 | Gillespie ............................. 370/351 |
| 6,018,521 | * | 1/2000 | Timbs et al. ........................ 370/342 |

* cited by examiner

Primary Examiner—Duc Nguyen
Assistant Examiner—Barry W. Taylor
(74) Attorney, Agent, or Firm—Brooks & Kushman P.C.

(57) ABSTRACT

A method and system is provided for selectively directing calls to wireless units in an integrated wireline and wireless communication system as part of a wireless extension service. When a call is forwarded by a wireline switch, the receiving wireless access manager determines whether the intended wireless subscriber unit is being serviced by a different access manager. If so, the call is automatically transferred using a high speed ATM inter-access manager communication line. Efficiency is therefore increased because the originating wireline switch does not need to set up an interoffice trunk line to accomplish the necessary call routing.

4 Claims, 2 Drawing Sheets

METHOD AND SYSTEM FOR CENTRAL OFFICE ACCESS TO MULTIPLE ACCESS CONTROLLERS FOR WIRELESS EXTENSION

TECHNICAL FIELD

The present invention relates generally relates to Generic C wireline and wireless interfaced communication systems, and more particularly to a call delivery routine for wireless unit extension calls which improves overall routing efficiency.

BACKGROUND ART

Generally, communication systems have been introduced which integrate wireless communication networks, such as a personal communication system (PCS), with existing wireline communication networks. In such systems, structure is provided for interfacing the capabilities of a land line telephone system with a radio link communications system, and to control the provision of private network service features for users of both radio link systems and land line systems. Call processing data associated with each subscriber is stored in a central service control point, or database, within the network. Call routing to either a land line or a wireless unit is controlled by a mobile controller network element in conjunction with the central database. Known systems can typically support all the services unique to each of the wireline telephone network and the wireless network using a single directory number and a central database.

However, efficiency in call routing for such integrated systems is directly dependent upon whether the wireline class 5 switch has an established access connection to an access manager or controller to which a destination wireless unit is currently registered. More specifically, because a single directory number is employed in known systems, calls to a wireless subscriber are routed to an associated wireline switch. The problem encountered with such arrangements is that if the associated wireline does not have an access connection to an access controller currently serving the intended wireless subscriber, an interoffice call over interoffice trunk lines must be set up to forward the call to a wireline switch which does have access to the serving access controller. Setting up of such an interoffice call adds delay to the call routing process, thereby decreasing system efficiency. In addition, since wireless systems typically incur additional cost charges for connecting wireline switches and trunk lines to route calls, the use of interoffice trunk lines to route calls also adds to a wireless system's operational costs.

Therefore, a needs exists for a call routing arrangement which supports wireless extension in an integrated wireline and wireless communication system which reduces the need for interoffice calls.

DISCLOSURE OF INVENTION

Accordingly, it is an object of the present invention to provide a method and system for supporting wireless service extension in an integrated wireline and wireless communication system which increases efficiency and reduces use of wireline resources by eliminating the need to use interoffice trunk lines to forward calls to wireless units currently being served by an access manager not connected to a transferring wireline switch.

It is another object of the present invention to provide a method and system for supporting wireless service extension in an integrated wireline and wireless communication system which increases efficiency by directly transferring calls to wireless units using high speed access manager-to-access manager communication links.

In carrying out the above objects and other objects, the present invention provides a method and system for selectively directing call traffic originating from the wireline network to a mobile transceiver unit associated with a particular wireline termination unit via a wireless extension service. The present invention provides a wireline switch assigned to handle calls to and from the subscriber wireline termination unit, and a wireless unit location register for maintaining a database for each of a plurality of geographic coverage areas. The database contains information indicative of mobile transceiver unit registration status and location. An access manager is located within each of the plurality of geographic coverage areas and arranged to communicate with the wireless unit location register for managing mobility of mobile transceiver units within the system. Each of the access manager s is linked by an inter-access manager communication line. In addition, each wireline switch is directly linked to an access manager located in a corresponding geographic area. Each access manager is arranged to determine whether an incoming call from the wireline switch is intended for a mobile transceiver unit currently being serviced by a different access manager, and automatically transferring the call to the serving access manager via the inter-access manager communication line. In accordance with a preferred embodiment, the inter-access manager communication line is implemented in the form of a high speed ATM line.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
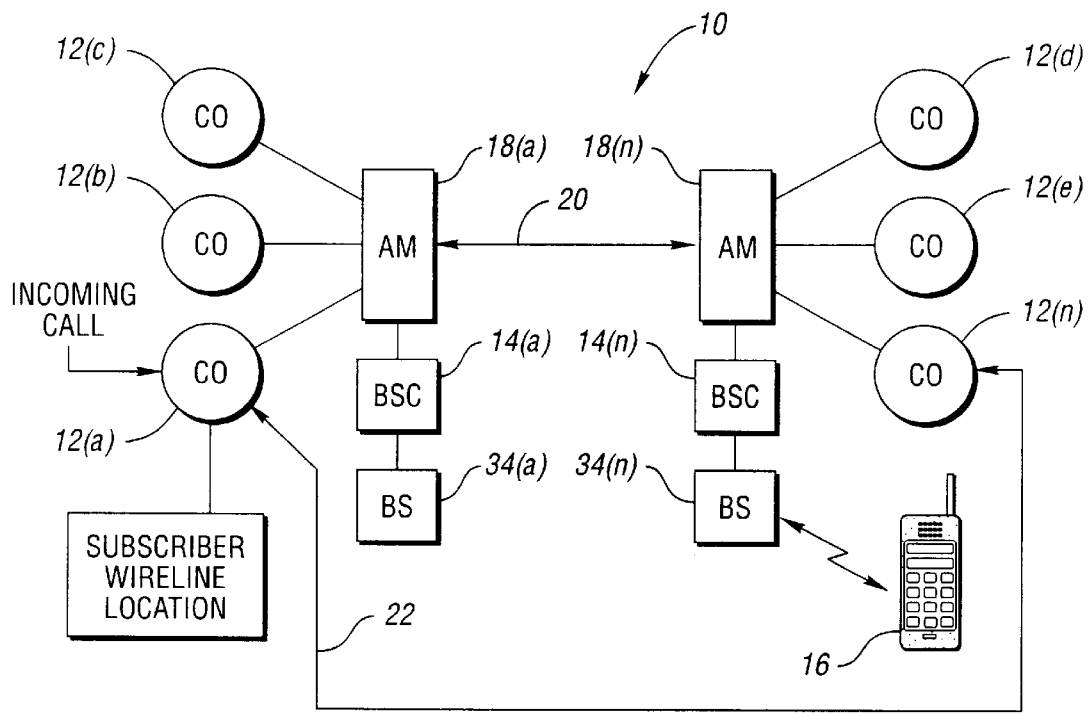
FIG. 1 is a schematic representation of a communication system in accordance with the present invention.

FIG. 1 illustrates a communications system 10 in accordance with the present invention. More specifically, communication system 10 is an integrated wireline and wireless system, i.e., a "Generic C" architecture, having a plurality of wireline class 5 switching central offices (CO) 12(a) through 12(n) connected to a plurality of base stations 14(a)–14(n) of a wireless network. Each respective base station 14 serves a corresponding set of subscriber mobile terminal units 16. The use of a Generic C architecture advantageously allows calls to a wireless subscriber without the need for a mobile switching center.

A set of access managers (AM) 18(a)–18(n) are provided for management of base station radio functions and switch connections to a given base station. Each CO 12 is associated with a respective AM via an appropriate access connection. The individual AMs 18 are linked together for inter-AM and hand-off communication using a high speed asynchronous transfer mode (ATM) protocol line 20, such as an IS-634 protocol.

The COs interface with a public switched telephone network (PSTN) and are set up to service individual mobile terminal units via the use of a single unique directory number. Incoming calls from the PSTN are thus routed to an assigned class 5 CO, which then seeks to route the incoming call to its corresponding link AM via the Generic C interface. As shown in FIG. 1, COs 12 are geographically distributed and linked only to a designated AM. Communications between different COs are supported via conventional interoffice trunk lines 22.

Figure 2:
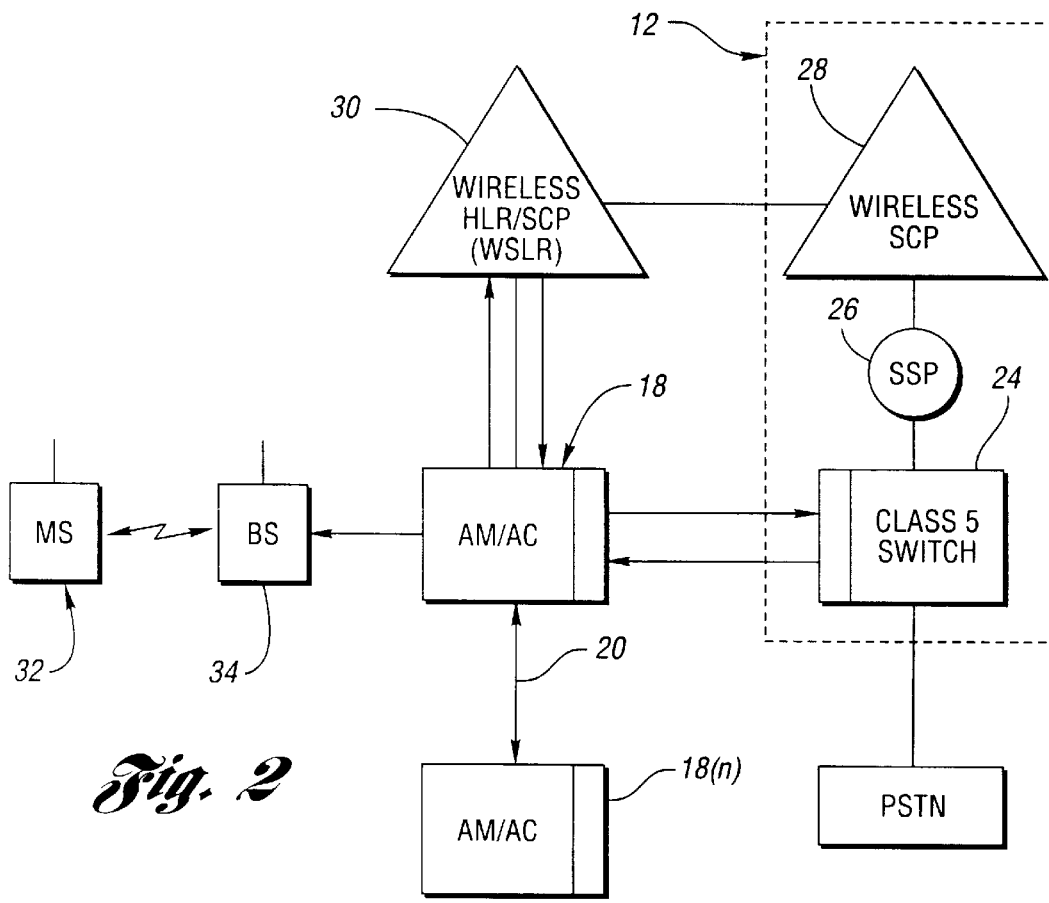
FIG. 2 is a schematic representation showing the connection of a wireline central office to an access manager in a wireless network.

FIG. 2 illustrates an exemplary embodiment showing the communication link between a CO and its linked AM. More specifically, CO 12 forms one of the network elements in the wireline network. The CO includes a class 5 type switching system 24 which interfaces with the PSTN. In addition, other network elements include Signaling Transfer Points (STPs) 26 and Service Control Point (SCP) databases 28. Switching system 24 is arranged in accordance to perform call processing on calls that originate, tandem or terminate at assigned sites. STPs 26 are used to facilitate call and feature control signal routing between wireline switching systems 24 and external SCP databases 28, as well as a plurality of wireline terminal units (not shown). Common Channel Signaling System No.7 protocol (SS7) is employed in the wireline network to support communication of signaling information relating to call setup, control, management and maintenance and Inter-network system signaling between the wireline and mobile network systems.

The mobile network includes a wireless location register 30 (a Home Location Register/Visitor Location Register (VLR/HLR)), and a plurality of wireless subscriber mobile terminal units 32. The functions performed by wireless location register 30 may be carried out either within a mobile switching system (particularly if such an element is employed in the wireless network), or external thereto as shown. Together, AM 18 and wireless location register 30 are responsible for management and processing of calls to and from mobile terminal units 32 registered in the geographic zone of coverage. Except as described below, the basic operations of all the above components are generally known to one skilled in the art. In general, AM 18 controls call delivery within the mobile network for mobile-to-mobile calls, as well as between the mobile network and the wireline network for wireline-to-mobile and mobile-to-wireline calls. AM 18 can be integrated with an access controller (AC), and is connected to VLR/HLR 30 to manage mobility of wireless units throughout the wireless network.

Generally, wireless components can communicate using IS-41 Mobile Application Part (MAP) protocols operating over SS7 networks. IS-41 data trunks are packet switched networks, having either X.25 or SS7 type transport options.

In operation, when AM 18 receives a call from the wireline network which is directed to a wireless unit 32, the AC deciphers the telephone number and alerts an appropriate base station (BS) 34 via its BSC to page the corresponding wireless unit 32. Similarly, when wireless unit 32 places a call, AM 18 accepts the dialing data from the BSC and dials the desired number for transmission to wireline network switch 24. The AM also processes mobile registration status data received from a BSC, switches calls to other cells via high speed line 20, processes diagnostic information, and compiles mobile billing statistics.

The wireless location register operates as master database for storing data related to each mobile subscriber, such as subscriber profile and mobility information together with relevant permanent data, such as access capabilities and subscriber services. In addition, as described below, the wireless location register provides AM 18 with information regarding the location and status of a mobile termination unit to allow incoming calls to be routed immediately thereto. Thus, AM 18, along with BSC 34, and HLR/VLR 30, operates to support basic wireless network operations such as registration, authentication, and call hand off between base stations.

Figure 3:
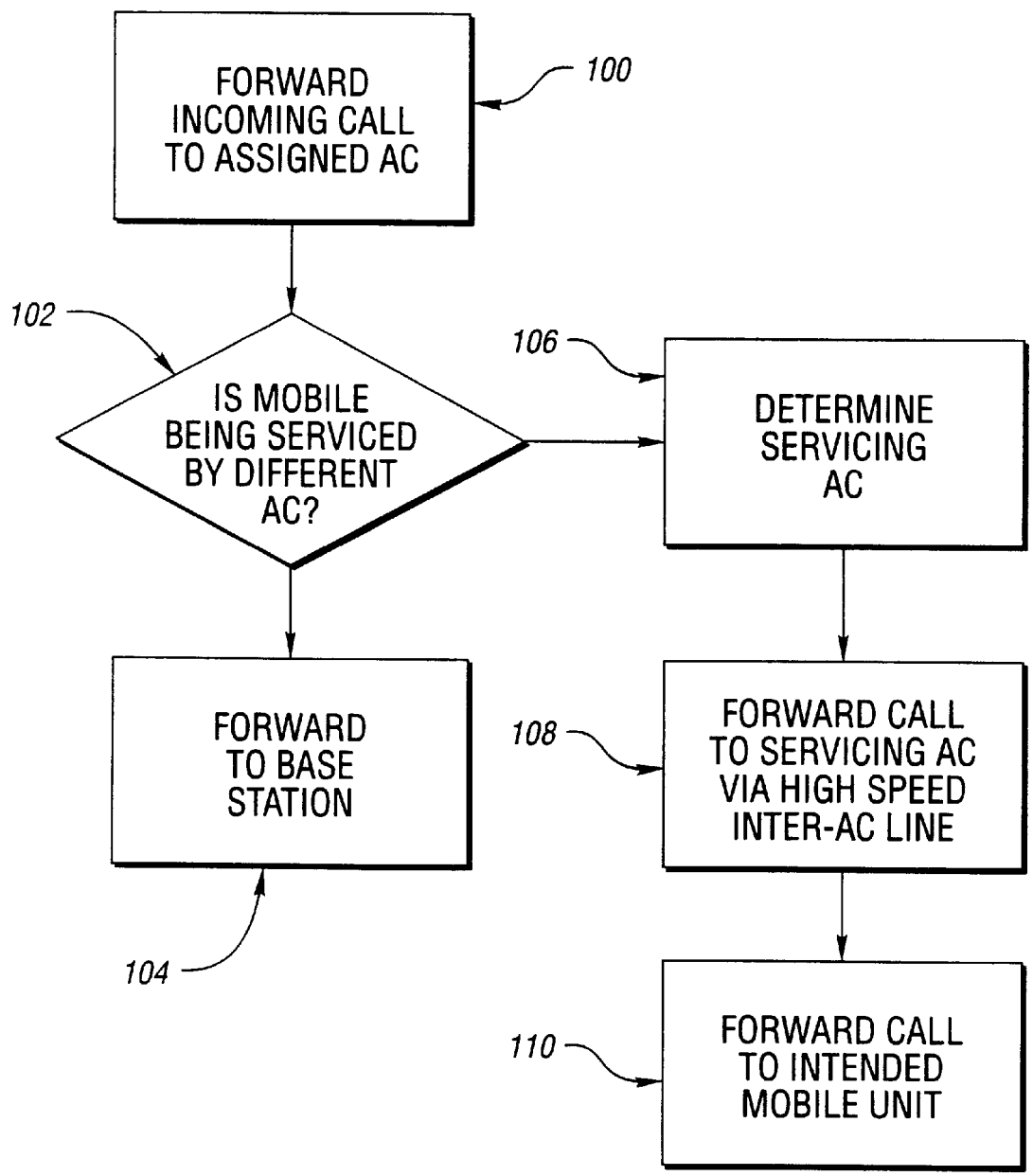
FIG. 3 is a flow diagram representing a overall operation of the present invention.

FIG. 3 is a flow chart illustrating the process for CO access to multiple AMs in accordance with the present invention. As denoted at block 100, when an incoming call is received from the PSTN, the call is forwarded to the assigned AM. In response, at block 102 the receiving AM will then determine from its corresponding HLR/VLR whether the intended mobile termination unit is presently registered in that AMs assigned zone. If so, the call is forwarded at block 104 to the linked base station for forwarding to the mobile termination unit as is well understood in the art.

However, if the mobile termination unit is determined through its registrations status as not being served in the receiving AM's assigned zone, the receiving AM will automatically determine at block 106 which AM is currently serving the intended mobile termination, and forward the call to that AM over high speed ATM link 20 at block 108. When the serving AM receives the call via the high speed ATM link, the call is processed and forwarded to the appropriate base station for communication to the intended mobile termination unit as denoted at block 110.

Thus, the communication system in accordance with the present invention eliminates the need for COs to transfer calls to another CO via the interoffice trunks when the originating CO does not have access rights to the serving AM. This in turn increases efficiency in call delivery and routing by eliminating the need for set up time on the interoffice trunk line.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a communication system having a wireline network linked to a wireless network, a system for selectively directing call traffic originating from the wireline network to a mobile transceiver unit associated with a particular wireline termination unit comprising:

a wireline switch assigned to handle calls to and from the subscriber wireline termination unit;

a wireless unit location register for maintaining a first database for each of a plurality of geographic coverage areas containing information indicative of mobile transceiver unit registration status and location;

an access manager located within each of the plurality of geographic coverage areas and arranged to communicate with the wireless unit location register for managing mobility of mobile transceiver units within the system, each of the access managers being linked by an inter-access manager communication line, wherein each wireline switch is directly linked to an access managers located in a corresponding geographic area, with each access manager arranged to determine whether an incoming call from the wireline switch is intended for a mobile transceiver unit currently being serviced by a different access manager, and automatically transferring the call to the serving access manager via the inter-access manager communication line.

2. The system of claim 1 wherein the serving access manager is arranged to forward the transferred call to the intended mobile transceiver unit.

3. The system of claim 1 wherein the inter-access manager communication line comprises a high speed ATM line.

4. The system of claim 3 wherein the high speed ATM line comprises an IS-634 protocol link.

* * * * *